(12) United States Patent
Jidhage

(10) Patent No.: US 9,774,098 B2
(45) Date of Patent: Sep. 26, 2017

(54) WIRELESS COMMUNICATION NODE WITH 4TX/4RX TRIPLE BAND ANTENNA ARRANGEMENT

(71) Applicant: Telefonaktiebolaget LM Ericsson (publ), Stockholm (SE)

(72) Inventor: Henrik Jidhage, Mölndal (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 246 days.

(21) Appl. No.: 14/441,044

(22) PCT Filed: Dec. 3, 2012

(86) PCT No.: PCT/EP2012/074215
§ 371 (c)(1),
(2) Date: May 6, 2015

(87) PCT Pub. No.: WO2014/086386
PCT Pub. Date: Jun. 12, 2014

(65) Prior Publication Data
US 2015/0295327 A1 Oct. 15, 2015

(51) Int. Cl.
*H01Q 3/00* (2006.01)
*H01Q 21/30* (2006.01)
(Continued)

(52) U.S. Cl.
CPC .............. *H01Q 21/30* (2013.01); *H01Q 3/30* (2013.01); *H01Q 3/36* (2013.01); *H01Q 1/246* (2013.01);
(Continued)

(58) Field of Classification Search
CPC ........ H01Q 21/22; H01Q 3/40; H01Q 3/2676; H01Q 1/246; H01Q 3/30; H01Q 3/36;
(Continued)

(56) References Cited

U.S. PATENT DOCUMENTS 4,052,723 A * 10/1977 Miller .................... H01Q 21/22
342/368
5,543,805 A * 8/1996 Thaniyavarn ........ H01Q 3/2676
342/368
(Continued)

FOREIGN PATENT DOCUMENTS

CN        103794870 B  *  2/2016
EP          2827449 A2      1/2015
(Continued)

OTHER PUBLICATIONS

International Search Report and Written Opinion dated Apr. 22, 2013 for International Application Serial No. PCT/EP2012/074215, International Filing Date: Dec. 3, 2012 consisting of 17-pages.
(Continued)

*Primary Examiner* — Harry Liu
(74) *Attorney, Agent, or Firm* — Christopher & Weisberg, P.A.

(57) ABSTRACT

A node in a wireless communication network, includes a 4TX/4RX triple band antenna arrangement with at least three antenna columns, each antenna column includes two sets of subarrays. Each set of subarrays has at least two subarrays with at least one antenna element each. Each set of subarrays includes antenna elements having one of a first polarization and a mutually orthogonal second polarization. For each subarray, the antenna elements are connected to a combined port of a corresponding filter device. Each filter device has a first filter port and a second filter port. For each set of subarrays, the first filter ports of each pair of filter devices that are connected to said set of subarrays are pair-wise connected to a corresponding phase altering device. The second filter ports of each pair of filter devices connected to the set of subarrays are pair-wise connected to another corresponding phase altering device.

16 Claims, 2 Drawing Sheets

(51) Int. Cl.
*H01Q 3/30* (2006.01)
*H01Q 3/36* (2006.01)
*H01Q 1/24* (2006.01)
*H01Q 21/26* (2006.01)
*H01Q 21/28* (2006.01)
*H04B 7/10* (2017.01)

(52) U.S. Cl.
CPC ............. *H01Q 21/26* (2013.01); *H01Q 21/28* (2013.01); *H04B 7/10* (2013.01)

(58) Field of Classification Search
CPC .... H01Q 3/22; H01Q 3/26; H01Q 21/28; H01Q 5/30; H01Q 5/307; H01Q 5/342; H04B 7/10
USPC .......................................................... 342/368
See application file for complete search history.

(56) References Cited

U.S. PATENT DOCUMENTS

| | | | | |
|---|---|---|---|---|
| 6,043,790 A * | 3/2000 | Derneryd | ................ | H01Q 3/26 342/368 |
| 6,972,716 B2 * | 12/2005 | Davis | ...................... | H01Q 3/22 342/368 |
| 7,132,979 B2 * | 11/2006 | Langenberg | ............ | H01Q 3/40 342/368 |
| 7,843,387 B2 * | 11/2010 | Shamsaifar | ............. | H01Q 3/36 342/372 |
| 8,253,625 B2 * | 8/2012 | Kim | ........................ | H01Q 3/30 342/368 |
| 8,269,668 B2 * | 9/2012 | Barker | .................. | H01Q 1/246 342/361 |
| 8,897,403 B2 * | 11/2014 | Stirland | .................. | H01Q 3/40 342/368 |
| 2007/0205955 A1 * | 9/2007 | Korisch | ................ | H01Q 1/246 343/853 |
| 2009/0322608 A1 * | 12/2009 | Adams | .................. | H01Q 1/246 342/368 |
| 2012/0194385 A1 * | 8/2012 | Schmidt | ................ | H01Q 1/246 342/368 |
| 2013/0002505 A1 * | 1/2013 | Teillet | .................... | H01Q 1/246 343/835 |
| 2013/0214983 A1 * | 8/2013 | Jidhage | ................. | H01Q 1/246 343/798 |
| 2013/0294302 A1 * | 11/2013 | Hofmann | ............... | H01Q 1/246 370/297 |
| 2014/0062834 A1 * | 3/2014 | Jidhage | ................. | H01Q 1/246 343/893 |
| 2015/0002361 A1 * | 1/2015 | Pu | ......................... | H01Q 1/246 343/853 |

FOREIGN PATENT DOCUMENTS

| | | |
|---|---|---|
| WO | 02007254 A1 | 1/2002 |
| WO | 03043127 A2 | 5/2003 |
| WO | 2006008452 A1 | 1/2006 |
| WO | 2008020178 A1 | 2/2008 |
| WO | 2012016941 A1 | 2/2012 |
| WO | 2012103831 A2 | 8/2012 |

OTHER PUBLICATIONS

Chinese language Office Action and Search Report for Chinese Serial No. 201280077447.8, with English Translation, dated Jun. 24, 2016 consisting of 12-pages.

English Translation and Chinese language 2nd Office Action and Search Report for Chinese Serial No. 01280077447.8, dated Jan. 23, 2017 consisting of 11-pages.

* cited by examiner

WIRELESS COMMUNICATION NODE WITH 4TX/4RX TRIPLE BAND ANTENNA ARRANGEMENT

TECHNICAL FIELD

The present invention relates to a node in a wireless communication network. The node comprises an antenna arrangement with at least three antenna columns, each antenna column comprising a first set of subarrays and a second set of subarrays. Each set of subarrays comprises at least two subarrays, and each subarray in turn comprising at least one antenna element. Said first set of subarrays comprises antenna elements having a first polarization and said second set of subarrays comprises antenna elements having a second polarization, the first polarization and the second polarization being mutually orthogonal. For each subarray, the antenna elements are connected to a combined port of a corresponding filter device, each filter device comprising a first filter port and a second filter port. Each filter device is arranged to separate signals of different frequency bands between the respective combined port and the respective filter ports such that each first filter port is arranged for transmission and reception of signals at one frequency band and each second filter port is arranged for reception of signals at another frequency band.

BACKGROUND

In a wireless communication networks, there are communication nodes, for example base stations. The base stations normally comprise sector-covering antenna arrangements. Such an antenna arrangement comprises a number of antenna ports corresponding to branches for uplink and downlink, where downlink denotes transmission, TX, from the base station to other nodes such as mobile terminals, and uplink denotes reception, RX, to the base station from other nodes such as mobile terminals. A downlink branch is thus a TX branch and an uplink branch is thus an RX branch.

Normally a typical system configuration may comprise two TX branches in the form of transmission channels and two RX branches in the form of reception channels, but system configurations with two TX branches and four RX branches are more attractive since the additional two RX branches provide large uplink improvements for a relatively small cost and volume increase.

Even more attractive are system configurations with four TX branches and four RX branches, enabling four-layer MIMO (Multiple Input Multiple Output) transmission. Furthermore, some operators have three different frequency bands, for example the frequency bands B1, B3 and B7 in the 1710-2690 MHz frequency interval. Four-layer MIMO implies that a four port antenna such as a dual column dual polarized antenna system is required for each frequency band, which in turn means that a complex antenna system with twelve antenna ports is required to support 4TX/4RX functionality on all three bands.

There is thus a need for an uncomplicated 4TX/4RX triple band antenna arrangement in a node comprising an efficiently used antenna aperture.

SUMMARY

It is an object of the present invention to provide a triple band antenna arrangement in a node, where the antenna arrangement has four transmission channels and four reception channels, where the triple band antenna arrangement is less complicated, comprising a more efficiently used antenna aperture, than what is previously known.

Said object is obtained by means of a node in a wireless communication network, where the node comprises an antenna arrangement. The antenna arrangement in turn comprises at least three antenna columns, each antenna column comprising a first set of subarrays and a second set of subarrays. Each set of subarrays comprises at least two subarrays, and each subarray in turn comprising at least one antenna element. Said first set of subarrays comprises antenna elements having a first polarization and said second set of subarrays comprises antenna elements having a second polarization, the first polarization and the second polarization being mutually orthogonal. For each subarray, the antenna elements are connected to a combined port of a corresponding filter device, each filter device comprising a first filter port and a second filter port. Each filter device is arranged to separate signals of different frequency bands between the respective combined port and the respective filter ports such that each first filter port is arranged for transmission and reception of signals at one frequency band and each second filter port is arranged for reception of signals at another frequency band. For each set of subarrays, the first filter ports of each pair of filter devices that are connected to said set of subarrays are pair-wise connected to a corresponding phase altering device. In the same way, for each set of subarrays, the second filter ports of each pair of filter devices that are connected to said set of subarrays are pair-wise connected to another corresponding phase altering device. The antenna arrangement is arranged for both reception and transmission at four different channels, and at three different frequency bands.

According to an example, each phase altering device is connected to an antenna port, each antenna port being arranged for reception and transmission at a certain frequency band.

According to another example, each antenna column is arranged for both reception and transmission at two different frequency bands.

According to another example, each filter device is constituted by a diplexer and/or each phase altering device is constituted by a phase shifter.

According to another example, the phase altering are arranged to control the phase of the subarrays such that an electrical steering of an antenna radiation main lobe of said antenna column is enabled.

More examples are disclosed in the dependent claims.

A number of advantages are obtained by means of the present invention. Mainly, a triple band antenna arrangement for four transmission channels and four reception channels in a node is provided, where the antenna arrangement is less complicated, comprising a more efficiently used antenna aperture, than what is previously known.

BRIEF DESCRIPTION OF THE DRAWINGS

The present invention will now be described more in detail with reference to the appended drawings, where.

DETAILED DESCRIPTION

Figure 1:
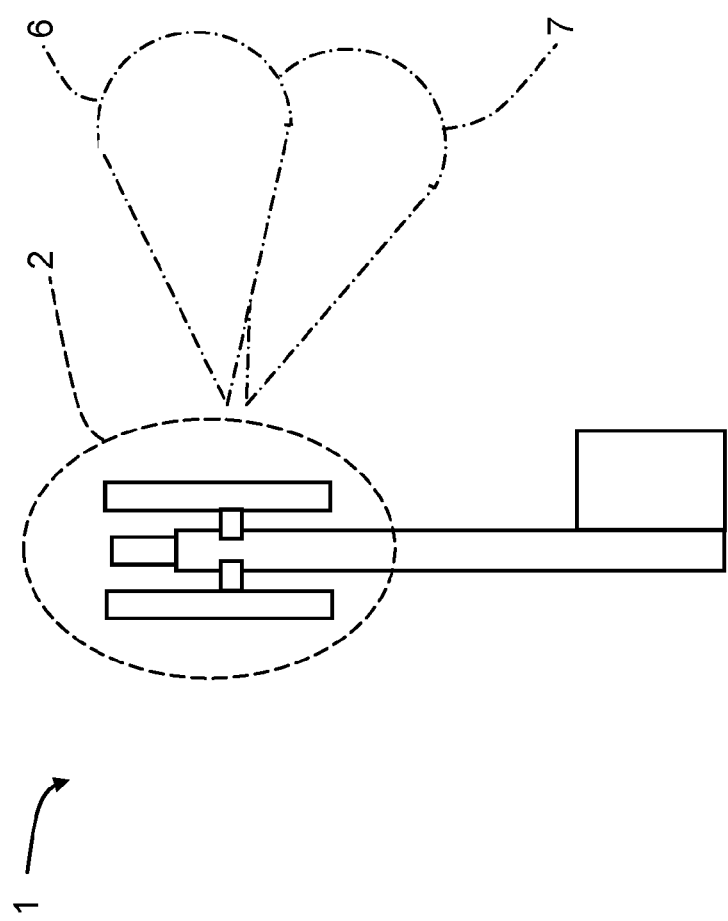
FIG. 1 shows a schematic side view of a node in a wireless communication network.

With reference to FIG. 1, there is a node 1 in a wireless communication network, the node comprising an antenna arrangement 2.

Figure 2:
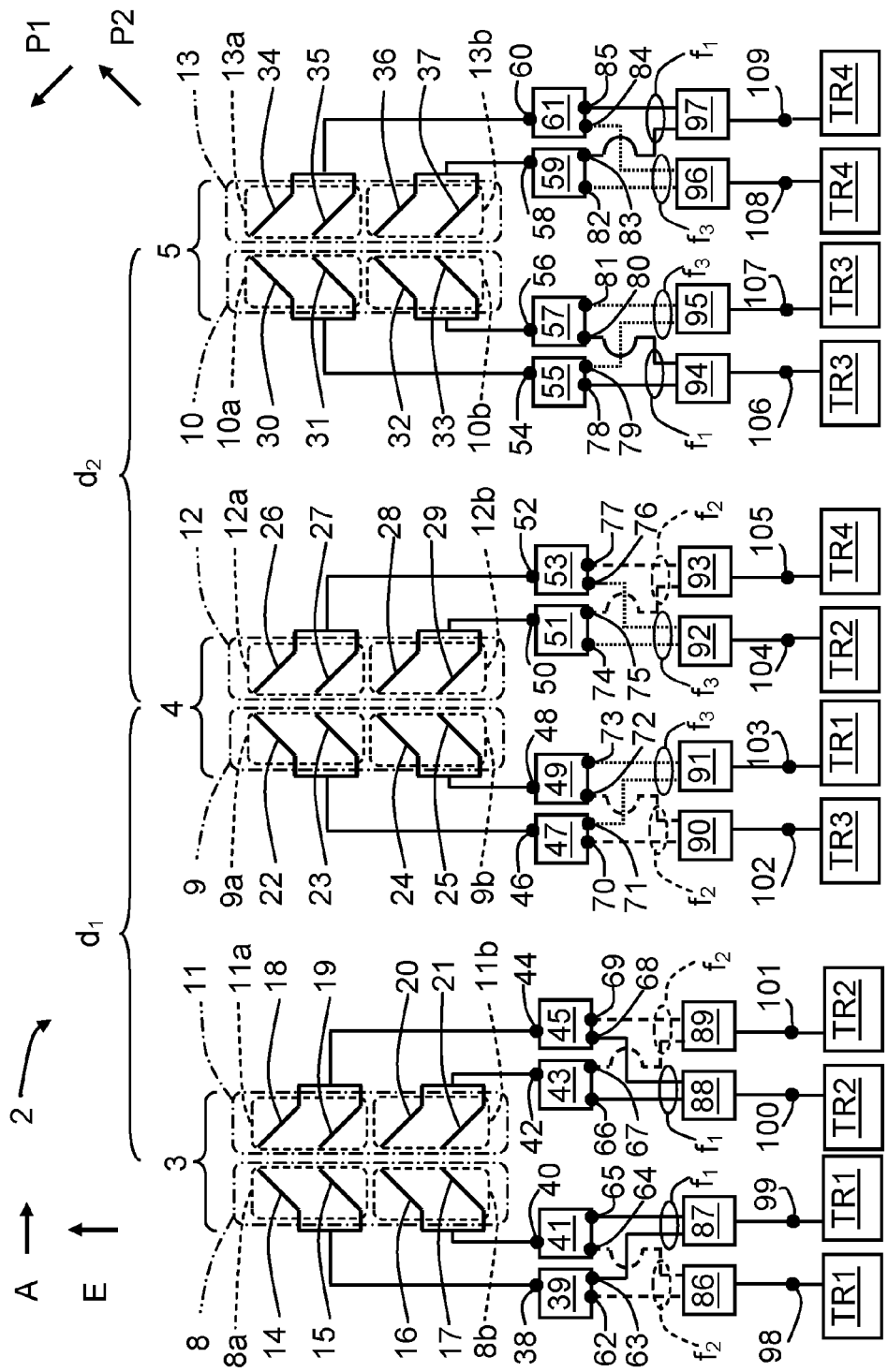
FIG. 2 shows a schematic view of an antenna arrangement according to the present invention.

With reference to FIG. 2, the antenna arrangement 2 comprises a first antenna column 3, a second antenna column 4 and a third antenna column 5. The first antenna column 3 and the second antenna column 4 are physically separated from each other by a first distance $d_1$ in an azimuth direction A. furthermore, the second antenna column 4 and the third antenna column 5 are physically separated from each other by a second distance $d_2$ in the azimuth direction A. The first distance $d_1$ and the second distance $d_2$ are in this example of equal magnitude.

All antenna columns 3, 4, 5 have respective main extensions in an elevation direction E, where the azimuth direction A and the elevation direction E are mutually orthogonal. The antenna columns 3, 4, 5 are arranged to radiate and/or receive signals by means of antenna radiation lobes 6, 7 in a well-known manner, as schematically indicated with dash-dotted lines in FIG. 1, Each antenna column 3, 4, 5 comprises a corresponding first set of subarrays 8; 9; 10 and a corresponding second set of subarrays 11, 12, 13. Each set of subarrays 8, 9, 10, 11, 12, 13 is indicated with a dash-dotted line.

The first set of subarrays 8 of the first antenna column 3 comprises two sub-arrays 8a, 8b, and the second set of subarrays 11 of the first antenna column 3 comprises two further sub-arrays 11a, 11b. Each subarray of the first set of subarrays 8 of the first antenna column 3 comprises two antenna elements 14, 15; 16, 17 having a first polarization P1. Furthermore, each subarray of the second set of subarrays 11 of the first antenna column 3 comprises two corresponding antenna elements 18, 19; 20, 21 having a second polarization P2, where the first polarization P1 and the second polarization P2 are mutually orthogonal.

In the same way, the first set of subarrays 9 of the second antenna column 4 comprises two sub-arrays 9a, 9b and the second set of subarrays 12 of the second antenna column 4 comprises two further sub-arrays 12a, 12b. Each subarray of the first set of subarrays 9 of the second antenna column 4 comprises two antenna elements 22, 23; 24, 25 having the first polarization P1. Furthermore, each subarray of the second set of subarrays 12 of the second antenna column 4 comprises two corresponding antenna elements 26, 27; 28, 29 having the second polarization P2.

Also in the same way, the first set of subarrays 10 of the third antenna column 5 comprises two sub-arrays 10a, 10b and the second set of subarrays 13 of the third antenna column 5 comprises four further sub-arrays 13a, 13b. Each subarray of the first set of subarrays 10 of the third antenna column 5 comprises two antenna elements 30, 31; 32, 33 having the first polarization P1. Furthermore, each subarray of the second set of subarrays 13 of the third antenna column 5 comprises two corresponding antenna elements 34, 35; 36, 37 having the second polarization P2.

Each sub-array 8a, 8b; 9a, 9b; 10a, 10b; 11a, 11b; 12a, 12b; 13a, 13b is indicated with a dashed line.

For a first subarray 8a of the first set of subarrays 8 of the first antenna column 3, the antenna elements 14, 15 are connected to a combined port 38 of a first diplexer 39, and for a second subarray 8b of the first set of subarrays 8 of the first antenna column 3, the antenna elements 16, 17 are connected to a combined port 40 of a second diplexer 41. In the same way, for a first subarray 11a of the second set of subarrays 11 of the first antenna column 3, the antenna elements 18, 19 are connected to a combined port 42 of a third diplexer 43, and for a second subarray 11b of the second set of subarrays 11 of the first antenna column 3, the antenna elements 20, 21 are connected to a combined port 44 of a fourth diplexer 45.

For a first subarray 9a of the first set of subarrays 9 of the second antenna column 4, the antenna elements 22, 23 are connected to a combined port 46 of a fifth diplexer 47, and for a second subarray 9b of the first set of subarrays 9 of the second antenna column 4, the antenna elements 24, 25 are connected to a combined port 48 of a sixth diplexer 49. In the same way, for a first subarray 12a of the second set of subarrays 12 of the second antenna column 4, the antenna elements 26, 27 are connected to a combined port 50 of a seventh diplexer 51, and for a second subarray 12b of the second set of subarrays 12 of the second antenna column 4, the antenna elements 28, 29 are connected to a combined port 52 of an eighth diplexer 53.

For a first subarray 10a of the first set of subarrays 10 of the third antenna column 5, the antenna elements 30, 31 are connected to a combined port 54 of a ninth diplexer 55, and for a second subarray 10b of the first set of subarrays 10 of the third antenna column 5, the antenna elements 32, 33 are connected to a combined port 56 of a tenth diplexer 57. In the same way, for a first subarray 13a of the second set of subarrays 13 of the third antenna column 5, the antenna elements 34, 35 are connected to a combined port 58 of an eleventh diplexer 59, and for a second subarray 13b of the second set of subarrays 13 of the third antenna column 5, the antenna elements 36, 37 are connected to a combined port 60 of a twelfth diplexer 61.

Each diplexer 39, 41, 43, 45, 47, 49, 51, 53, 55, 57, 59, 61 comprises a corresponding first filter port 62, 64, 66, 68, 70, 72, 74, 76, 78, 80, 82, 84 and a second filter port 63, 65, 67, 69, 71, 73, 75, 77, 79, 81, 83, 85.

The diplexers 39, 41, 43, 45, 47, 49, 51, 53, 55, 57, 59, 61 are in a known way arranged to separate signals of different frequency bands between the respective combined port 38, 39, 40, 41, 42, 43, 44 and the respective filter ports 62, 63; 64, 65; 66, 67; 68, 69; 70, 71; 72, 73; 74, 75; 76, 77; 78, 79; 80, 81; 82, 83; 84 such that each first filter port 62, 64, 66, 68, 70, 72, 74, 76, 78, 80, 82, 84 is arranged for transmission and reception of signals at one frequency band and each second filter port 63, 65, 67, 69, 71, 73, 75, 77, 79, 81, 83, 85 is arranged for reception of signals at another frequency band. As an example, if the first filter port 62 of the first diplexer 39 is arranged for transmission and reception of signals at a second frequency band $f_2$, the second filter port 63 of the first diplexer 39 is arranged for reception of signals at a first frequency band $f_1$.

According to the present invention, the first filter ports 62, 64 of the first diplexer 39 and the second diplexer 41 are connected to a first phase shifter 86 and are arranged for reception and transmission of signals of a second frequency band $f_2$. The second filter ports 63, 65 of the first diplexer 39 and the second diplexer 41 are connected to a second phase shifter 87 and are arranged for reception and transmission of signals of a first frequency band $f_1$. The first filter ports 66, 68 of the third diplexer 43 and the fourth diplexer 45 are connected to a third phase shifter 88 and are arranged for reception and transmission of signals of the first frequency band $f_1$. The second filter ports 67, 69 of the third diplexer 43 and the fourth diplexer 45 are connected to a fourth phase shifter 89 and are arranged for reception and transmission of signals of the second frequency band $f_2$.

Furthermore, the first filter ports 70, 72 of the fifth diplexer 47 and the sixth diplexer 49 are connected to a fifth phase shifter 90 and are arranged for reception and transmission of signals of the second frequency band $f_2$. The second filter ports 71, 73 of the fifth diplexer 47 and the sixth diplexer 49 are connected to a sixth phase shifter 91 and are arranged for reception and transmission of signals of a third frequency band $f_3$. The first filter ports 74, 76 of the seventh diplexer 51 and the eighth diplexer 53 are connected to a seventh phase shifter 92 and are arranged for reception and transmission of signals of the third frequency band $f_3$. The second filter ports 75, 77 of the seventh diplexer 51 and the eighth diplexer 53 are connected to an eighth phase shifter 93 and are arranged for reception and transmission of signals of the second frequency band $f_2$.

And furthermore, the first filter ports 78, 80 of the ninth diplexer 55 and the tenth diplexer 57 are connected to a ninth phase shifter 94 and are arranged for reception and transmission of signals of the first frequency band $f_1$. The second filter ports 79, 81 of the ninth diplexer 55 and the tenth diplexer 57 are connected to a tenth phase shifter 95 and are arranged for reception and transmission of signals of the third frequency band $f_3$. The first filter ports 82, 84 of the eleventh diplexer 59 and the twelfth diplexer 61 are connected to an eleventh phase shifter 96 and are arranged for reception and transmission of signals of the third frequency band $f_3$. The second filter ports 83, 85 of the eleventh diplexer 59 and the twelfth diplexer 61 are connected to a twelfth phase shifter 97 and are arranged for reception and transmission of signals of the first frequency band $f_1$.

The phase shifters 86, 87, 88, 89, 90, 91, 92, 93, 94, 95, 96, 97 are arranged to control the phase of the subarrays 8*a*, 8*b*; 9*a*, 9*b*; 10*a*, 10*b*; 11*a*, 11*b*; 12*a*, 12*b*; 13*a*, 13*b* such that an electrical steering of an antenna radiation main lobe 6, 7 is enabled.

Each phase shifter 86, 87, 88, 89, 90, 91, 92, 93, 94, 95, 96, 97 is connected to a corresponding first antenna port 98, second antenna port 99, third antenna port 100, fourth antenna port 101, fifth antenna port 102, sixth antenna port 103, seventh antenna port 104, eighth antenna port 105, ninth antenna port 106, tenth antenna port 107, eleventh antenna port 108 and twelfth antenna port 109, each antenna port 98, 99, 100, 101, 102, 103, 104, 105, 106, 107, 108, 109 being arranged for reception and transmission of signals at a certain frequency band. This means that the second antenna port 99, the third antenna port 100, the ninth antenna port 106 and the twelfth antenna port 109 are arranged for reception and transmission of signals at the first frequency band $f_1$. In the same way, the first antenna port 98, the fourth antenna port 101, the fifth antenna port 102 and the eighth antenna port 105 are arranged for reception and transmission of signals at the second frequency band $f_2$. Also in the same way, the sixth antenna port 103, the seventh antenna port 104, the tenth antenna port 107 and the eleventh antenna port 108 are arranged for reception and transmission of signals at the third frequency band $f_3$.

The first antenna port 98, the second antenna port 99 and the sixth antenna port 103 are connected to a first channel TR1 for transmission and reception. The third antenna port 100, the fourth antenna port 101 and the seventh antenna port 104 are connected to a second channel TR2 for transmission and reception. The fifth antenna port 102, the ninth antenna port 106 and the tenth antenna port 107 are connected to a third channel TR3 for transmission and reception. The eighth antenna port 105, the eleventh antenna port 108 and the twelfth antenna port 109 are connected to a fourth channel TR4 for transmission and reception. The channels TR1, TR2, TR3, TR4 are schematically indicated with boxes in FIG. 2.

The antenna arrangement 2 is thus arranged for both transmission and reception at four different channels TR1, TR2, TR3, TR4, and at three different frequency bands $f_1$, $f_2$, $f_3$.

The antenna ports 98, 99, 100, 101, 102, 103, 104, 105, 106, 107, 108, 109 are arranged to be connected to suitable transceiver devices (not shown) in a previously known manner for both transmission and reception at the four different channels TR1, TR2, TR3, TR4, and at the three different frequency bands $f_1$, $f_2$, $f_3$.

The positioning of the diplexers 39, 41, 43, 45, 47, 49, 51, 53, 55, 57, 59, 61 between the phase-shifters 86, 87, 88, 89, 90, 91, 92, 93, 94, 95, 96, 97 and the antenna elements 14, 15, 16, 17; 18, 19, 20, 21; 22, 23, 24, 25; 26, 27, 28, 29; 30, 31, 32, 33; 34, 35, 36, 37 enables individual electrical steering, electrical tilt, for all frequency bands.

As an example, the third frequency band $f_3$ comprises higher frequencies than the second frequency band $f_2$, and the second frequency band $f_2$ comprises higher frequencies than the first frequency band $f_1$. Furthermore, the first frequency band $f_1$ and the second frequency band $f_2$ are less spectrally separated than the second frequency band $f_2$ and the third frequency band $f_3$.

This means that the second antenna column 4 and the third antenna column 5 comprise diplexers 47, 49, 51, 53, 55, 57, 59, 61 that are arranged to separate the third frequency band $f_3$ from the first frequency band $f_1$ and the second frequency band $f_2$. Furthermore, the first antenna column 3 comprises diplexers 39, 41, 43, 45 that are arranged to separate the first frequency band $f_1$ from the second frequency band $f_2$. With the frequency bands chosen according to the above example, the diplexers 47, 49, 51, 53, 55, 57, 59, 61 of the second antenna column 4 and the third antenna column will be of a less complicated design than the diplexers 39, 41, 43, 45 of the first antenna column 3 due to the spectral separation of the frequency bands $f_1$, $f_2$, $f_3$. Hence the number of diplexers with a less complicated design is maximized.

According to the configuration described above, the first antenna column 3 and the third antenna column 5 are arranged to reception and transmission of signal by means of the first frequency band $f_1$; the physical separation between these antenna columns 3, 5 equals the sum of the first distance $d_1$ and the second distance $d_2$. The first antenna column 3 and the second antenna column 4 are arranged to reception and transmission of signal by means of the second frequency band $f_2$; the physical separation between these antenna columns 3, 4 equals the first distance $d_1$. The second antenna column 4 and the third antenna column 5 are arranged to reception and transmission of signal by means of the third frequency band $f_3$; the physical separation between these antenna columns 4, 5 equals the second distance $d_2$. If the first distance $d_1$ equals the second distance $d_2$, the distance between the first antenna column 3 and the third antenna column 5 is twice the distance between the first antenna column 3 and the second antenna column 4, as well as between the second antenna column 4 and the third antenna column 5.

This different column separation for different frequency bands will give different beamforming/MIMO capabilities for the different frequency bands. For example, in some scenarios, higher column separation implies an improved UL (Uplink) to the cost of a degraded DL (downlink).

The present invention is not limited to the above, but may vary within the scope of the appended claims. For example, it is conceivable that the polarizations P1, P2 have other directions than those shown, but should always be orthogonal.

When terms like orthogonal and parallel are used, these terms are not to be interpreted as mathematically exact, but within what is practically obtainable.

For each antenna column 3, 4, 5, the antenna elements 14, 15, 16, 17; 18, 19, 20, 21; 22, 23, 24, 25; 26, 27, 28, 29; 30, 31, 32, 33; 34, 35, 36, 37 in the sets of subarrays 8, 11; 9, 12; 10, 13 are shown as separate antenna elements, but are practically often pair-wise combined into dual polarized antenna elements, arranged for transmission and reception of the first polarization P1 and the second polarization P2, that share the same physical location, for example in the form of a cross.

The polarizations P1, P2 are shown to be perpendicular to the schematically indicated antenna elements 14, 15, 16, 17; 18, 19, 20, 21; 22, 23, 24, 25; 26, 27, 28, 29; 30, 31, 32, 33; 34, 35, 36, 37, which is the case for antenna elements in the form of slots, but this is only by way of example. For dipole antenna elements, the polarizations P1, P2 are parallel to the antenna elements, and for patch antenna elements, the polarization runs in a direction along the patch in dependence of its feeding.

The phase shifters 86, 87, 88, 89, 90, 91, 92, 93, 94, 95, 96, 97 may be constituted by any suitable phase altering devices, and the diplexers 39, 41, 43, 45, 47, 49, 51, 53, 55, 57, 59, 61 may be constituted by any suitable filter devices.

Generally, the antenna arrangement 2 comprises at least three antenna columns 3, 4, 5, each antenna column 3, 4, 5 comprising a first set of subarrays 8, 9, 10 and a second set of subarrays 11, 12, 13. Each set of subarrays 8, 9, 10; 11, 12, 13 comprises at least two subarrays 8a, 8b; 9a, 9b; 10a, 10b; 11a, 11b; 12a, 12b; 13a, 13b, and each subarray 8a, 8b; 9a, 9b; 10a, 10b; 11a, 11b; 12a, 12b; 13a, 13b in turn comprising at least one antenna element 14, 15; 16, 17; 18, 19; 20, 21; 22, 23; 24, 25; 26, 27; 28, 29; 30, 31; 32, 33; 34, 35; 36, 37. Each first set of subarrays 8, 9, 10 comprises antenna elements 14, 15; 16, 17; 22, 23; 24, 25; 30, 31; 32, 33 having a first polarization P1 and each second set of subarrays 11, 12, 13 comprises antenna elements 18, 19; 20, 21; 26, 27; 28, 29; 34, 35; 36, 37 having a second polarization P2. The first polarization P1 and the second polarization P2 are mutually orthogonal.

For each subarray 8a, 8b; 9a, 9b; 10a, 10b; 11a, 11b; 12a, 12b; 13a, 13b, the antenna elements are connected to a combined port 38, 40, 42, 44, 46, 48, 50, 52, 54, 56, 58, 60 of a corresponding filter device 39, 41, 43, 45, 47, 49, 51, 53, 55, 57, 59, 61, each filter device 39, 41, 43, 45, 47, 49, 51, 53, 55, 57, 59, 61 comprising a first filter port 62, 64, 66, 68, 70, 72, 74, 76, 78, 80, 82, 84 and a second filter port 63, 65, 67, 69, 71, 73, 75, 77, 79, 81, 83, 85. Each filter device 39, 41, 43, 45, 47, 49, 51, 53, 55, 57, 59, 61 is arranged to separate signals of different frequency bands between the respective combined port 38, 39, 40, 41, 42, 43, 44 and the respective filter ports 62, 63; 64, 65; 66, 67; 68, 69; 70, 71; 72, 73; 74, 75; 76, 77; 78, 79; 80, 81; 82, 83; 84 such that each first filter port 62, 64, 66, 68, 70, 72, 74, 76, 78, 80, 82, 84 is arranged for transmission and reception of signals at one frequency band and each second filter port 63, 65, 67, 69, 71, 73, 75, 77, 79, 81, 83, 85 is arranged for reception of signals at another frequency band.

For each set of subarrays 8, 9, 10, 11, 12, 13, the first filter ports 62, 64, 66, 68, 70, 72, 74, 76, 78, 80, 82, 84 of each pair of filter devices 39, 41; 43, 45; 47, 49; 51, 53; 55, 57; 59, 61 that are connected to said set of subarrays 8, 9, 10, 11, 12, 13 are pair-wise connected to a corresponding phase altering device 86, 88, 90, 92, 94, 96. Also, the second filter ports 63, 65, 67, 69, 71, 73, 75, 77, 79, 81, 83, 85 of each pair of filter devices 39, 41; 43, 45; 47, 49; 51, 53; 55, 57; 59, 61 that are connected to said set of subarrays 8, 9, 10, 11, 12, 13 are pair-wise connected to another corresponding phase altering device 87, 89, 91, 93, 95, 97.

For each antenna column 3, 4, 5, the number of antenna elements may vary, and the number of subarrays 8a, 8b; 9a, 9b; 10a, 10b; 11a, 11b; 12a, 12b; 13a, 13b may vary. This means that, for each antenna column 3, 4, 5, there may be more subarrays than the four shown, more diplexers and more output ports of each phase shifter. Each phase shifter may be connected to more than two diplexers, alternatively there may be more phase shifters.

Each subarray 8a, 8b; 9a, 9b; 10a, 10b; 11a, 11b; 12a, 12b; 13a, 13b in turn comprises at least one antenna element 14, 15; 16, 17; 18, 19; 20, 21; 22, 23; 24, 25; 26, 27; 28, 29; 30, 31; 32, 33; 34, 35; 36, 37.

Other configurations of the frequencies $f_1$, $f_2$, $f_3$ and the four channels TR1, TR2, TR3, TR4 for reception and transmission are of course conceivable; those disclosed is only an example of a working configuration.

The invention claimed is:

1. A node in a wireless communication network, the node comprising:
   an antenna arrangement, the antenna arrangement comprising:
      at least three antenna columns, each antenna column comprising:
         a first set of subarrays; and
         a second set of subarrays, each first set and second set of subarrays comprising:
            at least two subarrays each comprising:
               at least one antenna element;
         said first set of subarrays comprising antenna elements having a first polarization and said second set of subarrays comprising antenna elements having a second polarization, the first polarization and the second polarization being mutually orthogonal, where for each subarray the antenna elements are connected to a combined port of a corresponding filter device, each filter device comprising a first filter port and a second filter port, each filter device being arranged to separate signals of different frequency bands between the respective combined port and the respective filter ports such that each first filter port is arranged for transmission and reception of signals at one frequency band and each second filter port is arranged for reception of signals at another frequency band; and
         for each of said first set and second set of subarrays, the first filter ports of each pair of filter devices that are connected to said set of subarrays are pair-wise connected to a corresponding phase altering device, and the second filter ports of each pair of filter devices that are connected to said set of subarrays are pair-wise connected to another corresponding phase altering device, where the antenna arrangement is arranged for both reception and transmission at four different channels, and at three different frequency bands ($f_1$, $f_2$, $f_3$); and
      a first antenna column of the at least three antenna columns configured for reception and transmission at frequencies f1 and f2, a second antenna column of the at least three antenna columns configured for reception and transmission at frequencies f2 and f3, and a third antenna column of the at least three antenna columns configured for reception and transmission at frequencies f1 and f3.

2. The node of claim 1, wherein each phase altering device is connected to an antenna port, each antenna port being arranged for reception and transmission at a certain frequency band.

3. The node of claim 2, wherein each filter device is constituted by a diplexer.

4. The node of claim 1, wherein the antenna columns have respective main extensions in an elevation direction (E).

5. The node of claim 4, wherein the antenna columns are separated in one of an azimuth direction (A) and the elevation direction (E), the azimuth direction (A) and the elevation direction (E) being mutually orthogonal.

6. The node of claim 4, wherein the phase altering devices are arranged to control the phase of the subarrays such that an electrical steering of an antenna radiation main lobe of said antenna column is enabled.

7. The node of claim 1, wherein each filter device is constituted by a diplexer.

8. The node of claim 1, wherein each phase altering device is constituted by a phase shifter.

9. The node of claim 1, wherein the phase altering devices are arranged to control the phase of the subarrays such that an electrical steering of an antenna radiation main lobe of said antenna column is enabled.

10. The node of claim 4, wherein each filter device is constituted by a diplexer.

11. The node of claim 2, wherein each phase altering device is constituted by a phase shifter.

12. The node of claim 4, wherein each phase altering device is constituted by a phase shifter.

13. The node of claim 2, wherein the phase altering devices are arranged to control the phase of the subarrays such that an electrical steering of an antenna radiation main lobe of said antenna column is enabled.

14. The node of claim 4, wherein the phase altering devices are arranged to control the phase of the subarrays such that an electrical steering of an antenna radiation main lobe of said antenna column is enabled.

15. The node of claim 1, wherein the phase altering devices are arranged to control the phase of the subarrays such that an electrical steering of an antenna radiation main lobe of said antenna column is enabled.

16. The node of claim 1, wherein each column has four transceivers, two for each frequency of the two frequencies at which the column transmits and receives.

* * * * *

UNITED STATES PATENT AND TRADEMARK OFFICE
CERTIFICATE OF CORRECTION

| | |
|---|---|
| PATENT NO. | : 9,774,098 B2 |
| APPLICATION NO. | : 14/441044 |
| DATED | : September 26, 2017 |
| INVENTOR(S) | : Jidhage |

It is certified that error appears in the above-identified patent and that said Letters Patent is hereby corrected as shown below:

On the Title Page

In Item (57), under "ABSTRACT", in Column 2, Line 1, delete "network," and insert -- network --, therefor.

In the Specification

In Column 1, Line 9, delete "each to" and insert -- each --, therefor.

Signed and Sealed this
Twenty-second Day of May, 2018

Andrei Iancu
*Director of the United States Patent and Trademark Office*